UNITED STATES PATENT OFFICE.

WILLIAM A. REID, OF SPRING GROVE, INDIANA.

CHEWING-GUM.

1,206,467.  Specification of Letters Patent.  Patented Nov. 28, 1916.

No Drawing.   Application filed April 10, 1916.   Serial No. 90,077.

*To all whom it may concern:*

Be it known that I, WILLIAM A. REID, a citizen of the United States, residing in Spring Grove, in the county of Wayne and State of Indiana, have invented a new and useful Chewing-Gum, of which the following is a full, clear, and comprehensive specification and exposition, being such as will enable others to manufacture the same with exactitude and satisfaction.

The object of my invention, broadly stated, is to provide chewing gum which may be made entirely of domestic products, which will be smooth and pleasant to one's mouth, will not adhere to one's teeth or the lining of the mouth, will be absolutely sanitary and healthful in its constituent elements, will not produce injurious chemical reactions when mixed with saliva, and which can be manufactured and sold at a comparatively low price.

Other minor objects and particular advantages of this invention will be brought out and will suggest themselves in the course of the following description, and that which is new will be set forth in the appended claims.

The basic ingredient of this invention is purified paraffin, with which is combined, as sub-bases, some form of sweetening, such as sugar, together with wheat flour or its equivalent.

To the above may be added the minor ingredients, such as cocoa, a flavor, and in some instance a coloring matter as desired.

I have determined that following named ingredients, or their equivalents, combined in substantially the following named proportions will give the most satisfactory results:

| | |
|---|---|
| Paraffin | 2½ ounces. |
| Sugar | 2 ounces. |
| Flour | ¼ ounce. |
| Cocoa | ¼ ounce. |

Flavor and color to suit the taste.

It is to be understood however that the proportions given may be variously changed to meet various conditions as to taste and climate.

In practice the paraffin should be heated until it is in a liquid state. The sugar, flour, and cocoa, should be pulverized together and then slowly sifted into the liquid paraffin and thoroughly mixed therewith. Then after the above compost has arrived at a lower degree of temperature the flavor and the color may be added and mixed therewith. The whole may then be molded into cakes or made into sheets, from which it may be divided into any desired shape or sizes as desired to adapt it for distribution and sale.

It will be found that the above will answer all of the requirements of a satisfactory chewing gum, and will attain the objects previously mentioned.

Having now fully shown and described my invention, what I claim and desire to secure by Letters Patent of the United States, is—

1. Chewing gum comprising paraffin as a base, and sugar and flour as sub-basic elements.

2. Chewing gum composed of paraffin as the base, sugar and flour as sub-basic elements, cocoa and flavor as minor elements.

3. Chewing gum composed of paraffin as the base, combined with sugar, flour and cocoa, and a flavor.

4. Chewing gum composed of paraffin as the base, finely powdered minor elements added to the paraffin while the latter is in a liquid state.

5. Chewing gum composed of paraffin, sugar, flour, cocoa, a flavor, and a coloring element combined substantially as set forth.

In testimony whereof I have hereunto subscribed my name to this specification in the presence of two subscribing witnesses.

WILLIAM A. REID.

Witnesses:
ROBT. W. RANDLE,
R. E. RANDLE.